US006554947B2

(12) United States Patent
Pfotenhauer et al.

(10) Patent No.: US 6,554,947 B2
(45) Date of Patent: Apr. 29, 2003

(54) METHOD FOR ATTACHING THERMOPLASTIC STRIPS TO THERMOPLASTIC ROOF MEMBRANES

(75) Inventors: Claus Pfotenhauer, Alpnach-Dorf (CH); Brian Whelan, Canton, MA (US); James C. Rubenacker, Lakeville, MA (US)

(73) Assignee: Sarnafil, Inc., Canton, MA (US)

( * ) Notice: Subject to any disclaimer, the term of this patent is extended or adjusted under 35 U.S.C. 154(b) by 93 days.

(21) Appl. No.: 09/739,183

(22) Filed: Dec. 18, 2000

(65) Prior Publication Data

US 2002/0074084 A1 Jun. 20, 2002

(51) Int. Cl.[7] .............................................. B32B 31/00
(52) U.S. Cl. ...................... 156/304.1; 156/82; 156/497; 156/499; 156/574
(58) Field of Search ............................... 156/304.1, 64, 156/71, 497, 499, 544, 574, 82; 428/61, 57; 52/746.11; 431/181

(56) References Cited

U.S. PATENT DOCUMENTS

| 2,367,725 A | 1/1945 | Lindh et al. ................... 154/42 |
| 2,372,737 A | 4/1945 | Phillips, Jr. ................... 154/42 |
| 3,080,910 A | 3/1963 | Whitney, Jr. .................. 156/497 |
| 3,962,016 A | 6/1976 | Alfter et al. .................. 156/304 |
| 3,984,270 A | 10/1976 | Haage ............................ 156/71 |
| 4,714,509 A | * 12/1987 | Gruber ...................... 156/272.2 |
| 4,855,004 A | * 8/1989 | Chitjian ........................ 156/359 |
| 4,913,772 A | 4/1990 | Taylor et al. ................. 156/499 |
| 5,045,146 A | 9/1991 | Rundo ........................... 156/391 |
| 5,520,761 A | 5/1996 | Kalwara et al. ............... 156/157 |
| 5,572,843 A | * 11/1996 | Jordan ........................... 52/410 |
| 5,772,359 A | * 6/1998 | Marty ............................ 404/94 |
| 5,865,942 A | * 2/1999 | Sinclair ........................ 156/499 |
| 6,155,321 A | * 12/2000 | Bindschedler et al. ....... 156/497 |
| 6,187,122 B1 | * 2/2001 | Hubbard et al. ............... 156/82 |
| 6,230,461 B1 | * 5/2001 | Piront ........................... 52/408 |

* cited by examiner

Primary Examiner—Richard Crispino
Assistant Examiner—Sue A. Purvis
(74) Attorney, Agent, or Firm—Pandiscio & Pandiscio; Scott R. Foster

(57) ABSTRACT

A method for attaching thermoplastic strips to a roof of thermoplastic roof membranes includes the steps of providing strips of thermoplastic material, the strips each comprising an upstanding central portion extending lengthwise thereof, and opposed flange portions extending widthwise from the central portion, positioning the strip proximate a selected position on the roof for attachment to the roof, providing a self-propelled apparatus having means for affixing the strip onto the roof, and directing the apparatus along a line delineating the selected position on the roof to guide the strip into position adjacent the line and to affix the strip onto the roof membrane alongside the line.

12 Claims, 10 Drawing Sheets

METHOD FOR ATTACHING THERMOPLASTIC STRIPS TO THERMOPLASTIC ROOF MEMBRANES

BACKGROUND OF THE INVENTION

1. Field of the Invention

The invention relates to the application of protective layers onto roofs of buildings, particularly to the application of thermoplastic roof membranes onto roofs of buildings, and, more specifically, to a method for attaching thermoplastic strips to the thermoplastic roof membranes.

2. Description of the Prior Art

It is known to apply thermoplastic membranes to roof tops to prevent leakage of water through the roof. Typically, the membranes are sealed to each other along overlapping edges. It is also known to apply metal sheets to roof tops. The metal sheets typically are configured with spaced stiffening ribs and with interlocking edges. To join the metal sheets together, the junctures of the interlocking edges usually are covered with a channel member, which additionally discourages water passing through the metal sheet junctures.

The appearance of the metal clad roof is generally regarded as quite attractive, in part because of the aesthetic qualities of the roof, and perhaps in part because of the perception that metal roofs are relatively expensive and therefore "attractive". For whatever reason, the appearance of metal roofs is generally acclaimed.

In view of the widespread appreciation of the appearance of the metal clad roofs, there have been attempts to duplicate the appearance thereof in thermoplastic clad roofs. The distinctive characteristic of the metal clad roof is the presence of the upstanding channel members, or junctures, of the metal sheets. To duplicate this appearance, thermoplatic strips have been secured to the thermoplastic membranes, sometimes by adhesive, and sometimes by the application of heat, which is done manually with hand-held blowers. Unfortunately, application of the strips manually is a time consuming and labor intensive process, increasing substantially the cost of the roofing and decreasing the cost advantage gained by selecting thermoplastic roofing over metal roofing. Manual application also increases opportunity for error and is not conducive to creating straight and/or parallel and/or equidistant lines.

Accordingly, there is a need for a method for enhancing the appearance of a thermoplastic roof membrane covering by quick and inexpensive application of thermoplastic strips to thermoplastic roof membranes.

SUMMARY OF THE INVENTION

An object of the invention is, therefore, to provide a method for attaching thermoplastic strips to thermoplastic roof membranes.

With the above and other objects in view, as will hereinafter appear, a feature of the invention is the provision of a method for attaching thermoplastic strips to thermoplastic roof membranes. The method includes the steps of providing strips of thermoplastic material, the strips each comprising an upstanding central portion extending lengthwise thereof, and opposed flange portions extending widthwise from the central portion, positioning the strip proximate a selected position on a roof membrane for attachment thereto, providing a self-propelled apparatus having means for affixing the strip onto the roof membrane, and directing the apparatus along a line delineating the selected position on the roof membrane to guide the strip into position adjacent the line and to affix the strip onto the roof membrane alongside the line.

The above and other features of the invention, including various novel details of construction and combinations of method steps, will now be more particularly described with reference to the accompanying drawings and pointed out in the claims. It will be understood that the particular method embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 9:
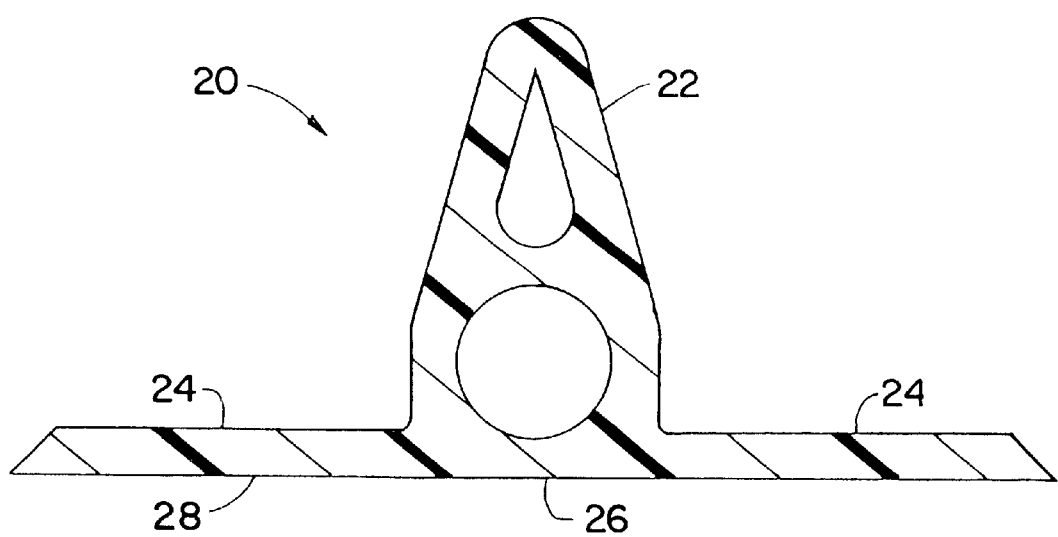
FIG. 9 is an enlarged cross-sectional view of a strip of the type shown in FIGS. 2, and 4–8.
Figure 10:
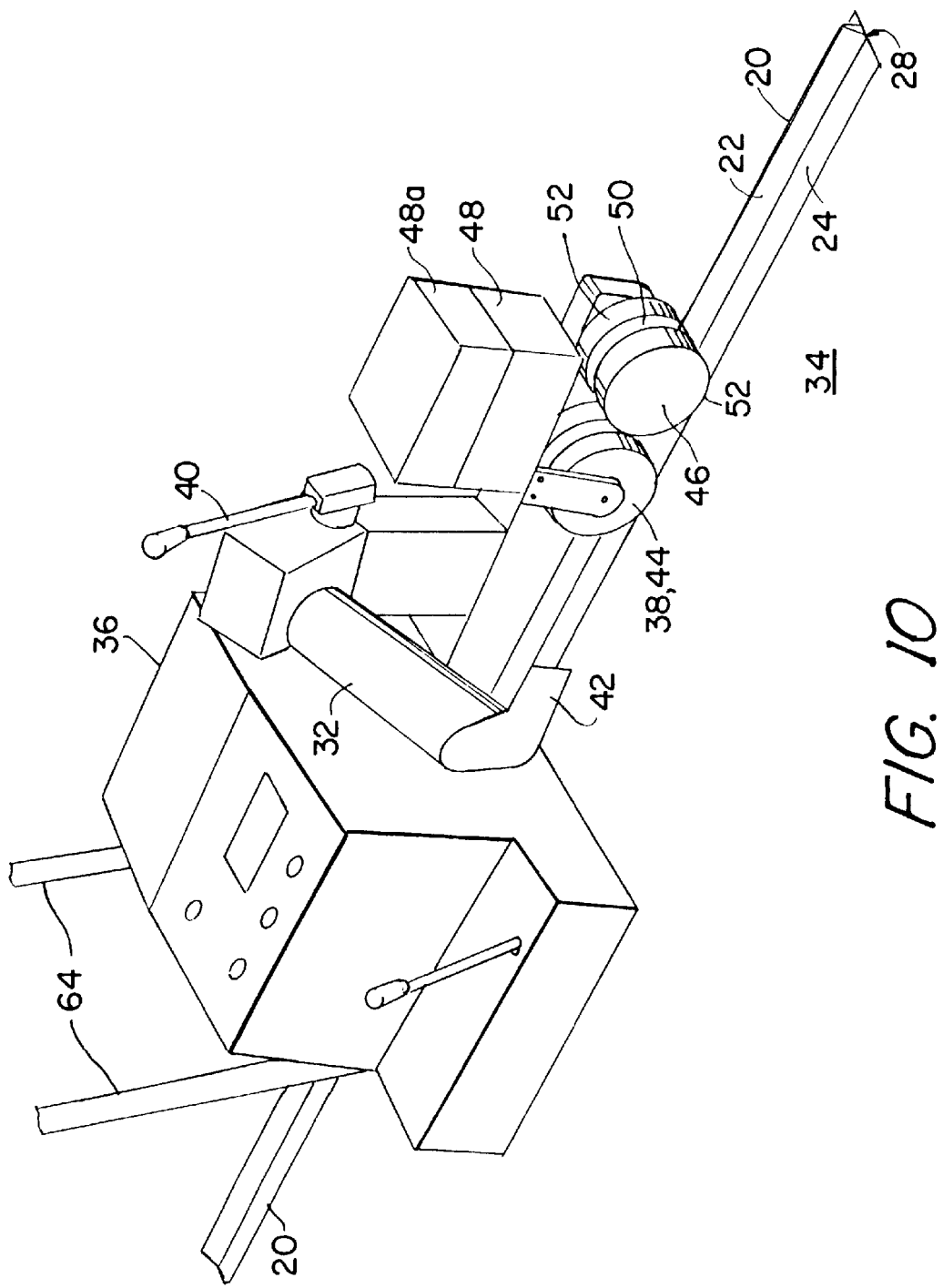
FIG. 10 is a perspective view of the apparatus of FIGS. 1–8 in position for use in attaching the strip of FIG. 9 to a roof top membrane.

The strips 20 of thermoplastic material used in the method presented herein are shown in FIGS. 2 and 4–10. The strips 20 may be wholly of a thermoplastic material, or of a thermoplastic composite, or of a different material coated with thermoplastic (all hereinafter "thermoplastic strips"). Referring to FIG. 9, it will be seen that each of the strips 20 includes an upstanding central portion 22, which extends along the length of the strip, and two opposed flange portions 24 which extend outwardly and oppositely from the central portion 22, widthwise of the strip 20, and also extend along the length of the strip. The strip central portion 22 includes a bottom portion 26 which, along with the flange portions 24, forms a unitary bottom surface 28.

The apparatus 30 used in the method presented herein preferably includes means for fusing the strip onto a roof membrane. Such means includes a nozzle 32 (FIGS. 3–8 and 10) for blowing hot air against the bottom surface 28 of the strip 20 and, simultaneously, against the upper surface of a roof membrane 34 of thermoplastic material. The nozzle 32 is mounted on a housing 36 which is self-propelled by drive wheels 38 movably supporting the housing 36. The nozzle 32 is pivotally mounted on the housing 36 and is movable, as by a lever 40, from an inoperative position, shown in FIG. 7, to an operative position, shown in FIG. 8. The nozzle 32 is provided with a generally planar blade-like outlet portion 42, which may be moved into position between the strip 20 and the underlying membrane 34.

The means for fusing the strip 20 to the membrane 34 further includes at least one pressure wheel 44 mounted on the apparatus 30 to engage the just-heated strip 20 and press the strip into firm engagement with the just-heated membrane 34, to weld the membrane and strip together, to provide a permanent attachment therebetween. Preferably, the pressure wheel 44 also constitutes a drive wheel 38 and, preferably, there is provided an additional pressure wheel 46. Weight members 48, 48a (FIG. 10) may be mounted on the apparatus 30 to add to the pressure of the pressure wheel engagement with the strip.

The pressure wheels 44, 46 are each provided with a peripheral groove 50 for receiving the strip central portion 22 (FIG. 5) and first and second peripheral edges 52 on either side of the groove 50 for engaging the strip opposed flange portions 24.

Figure 1:
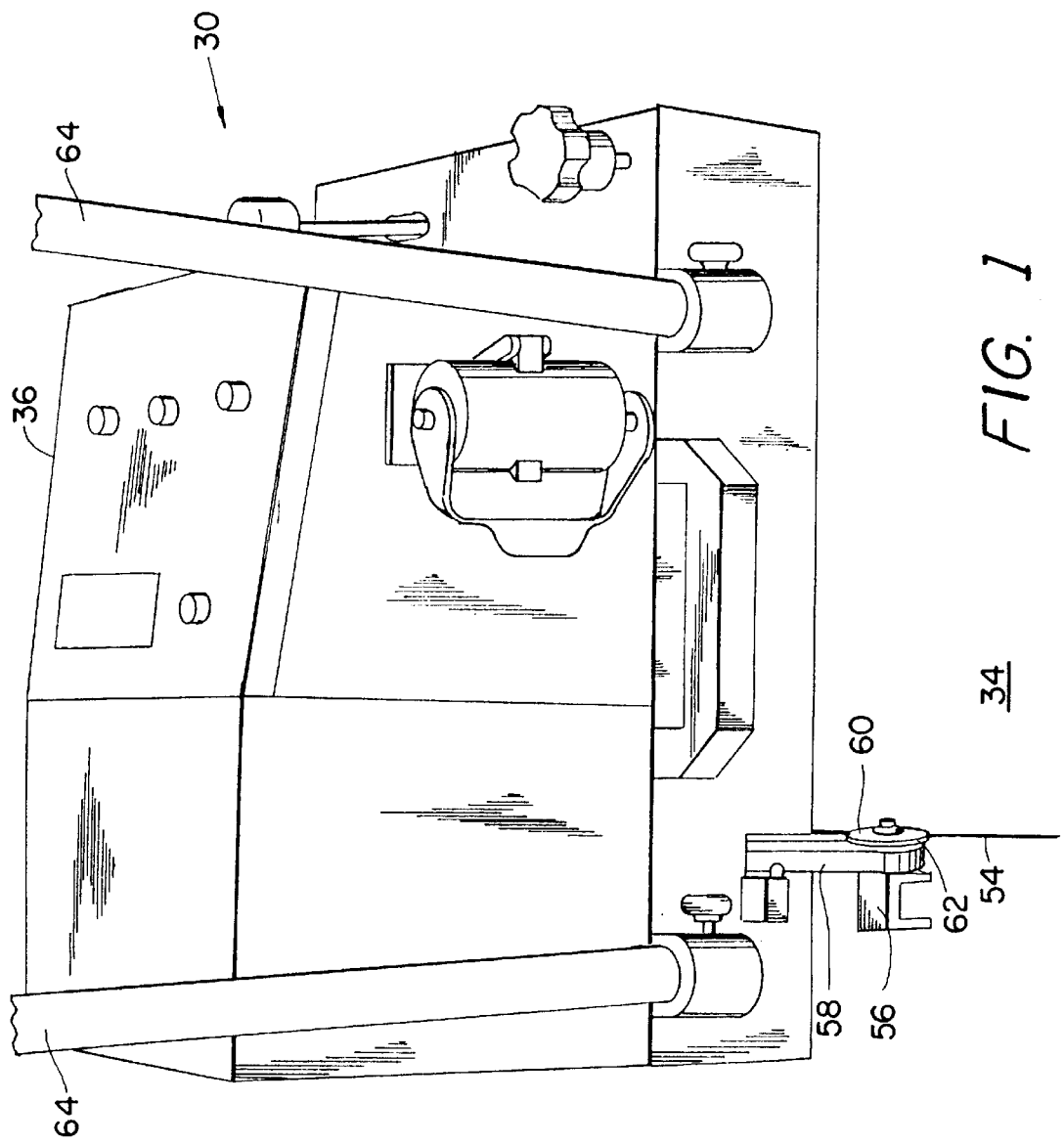
FIG. 1 is a perspective, generally front view of one form of apparatus, the provision of which is a step in the illustrated embodiment of the invention.
Figure 2:
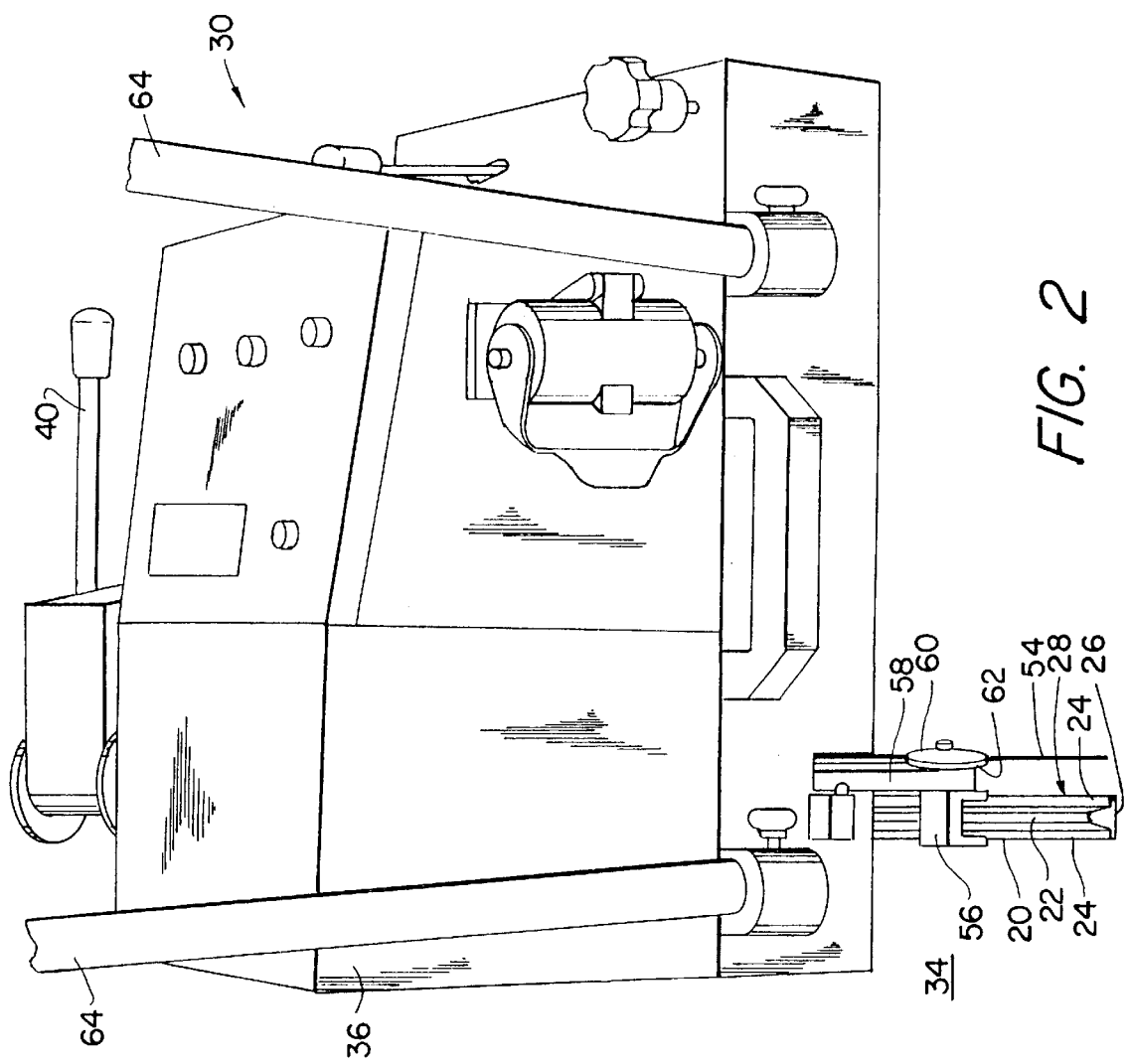
FIG. 2 is similar to FIG. 1, but showing the apparatus in use.
Figure 3:
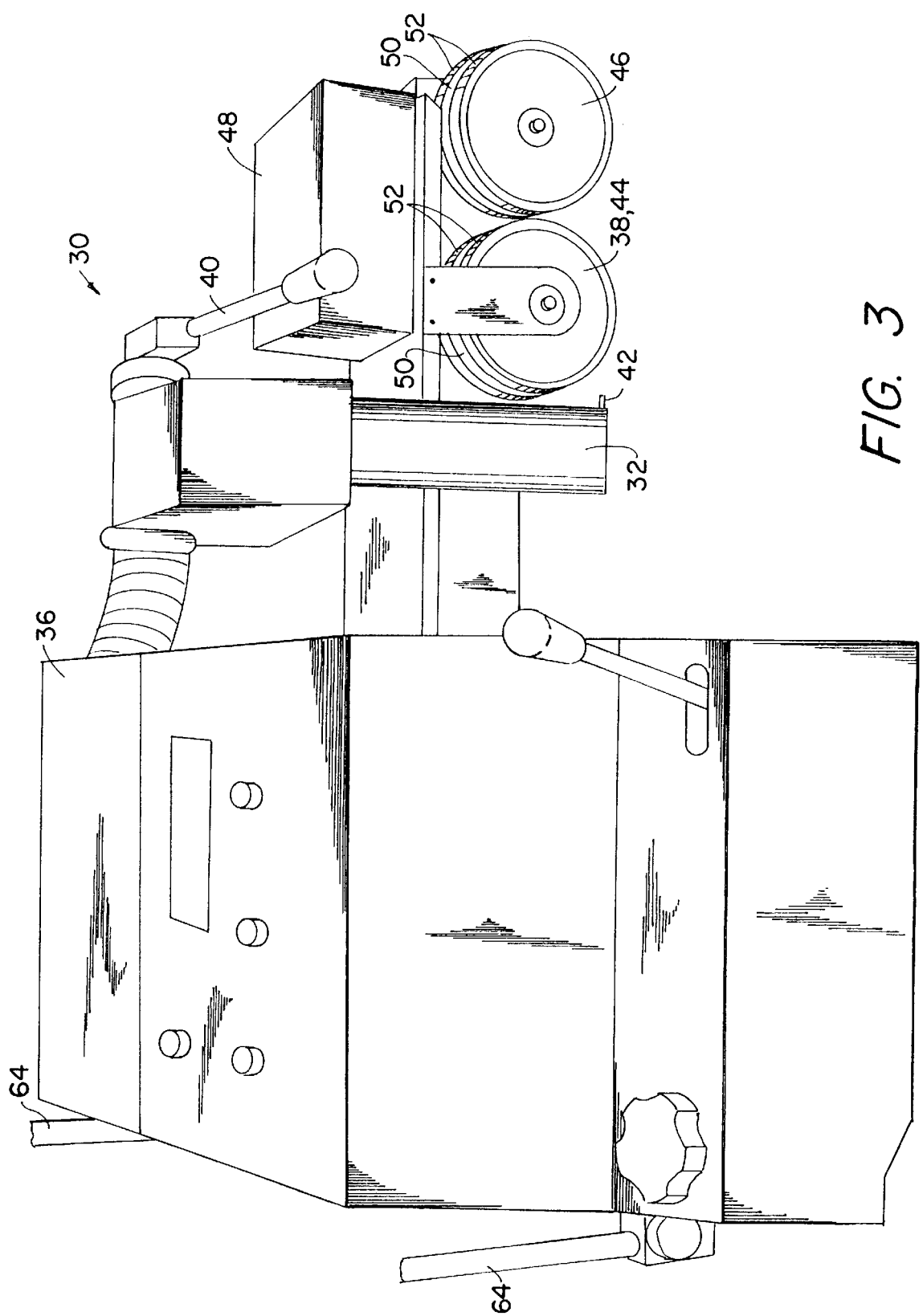
FIG. 3 is a perspective, generally side view of the apparatus of FIG. 1.
Figure 4:
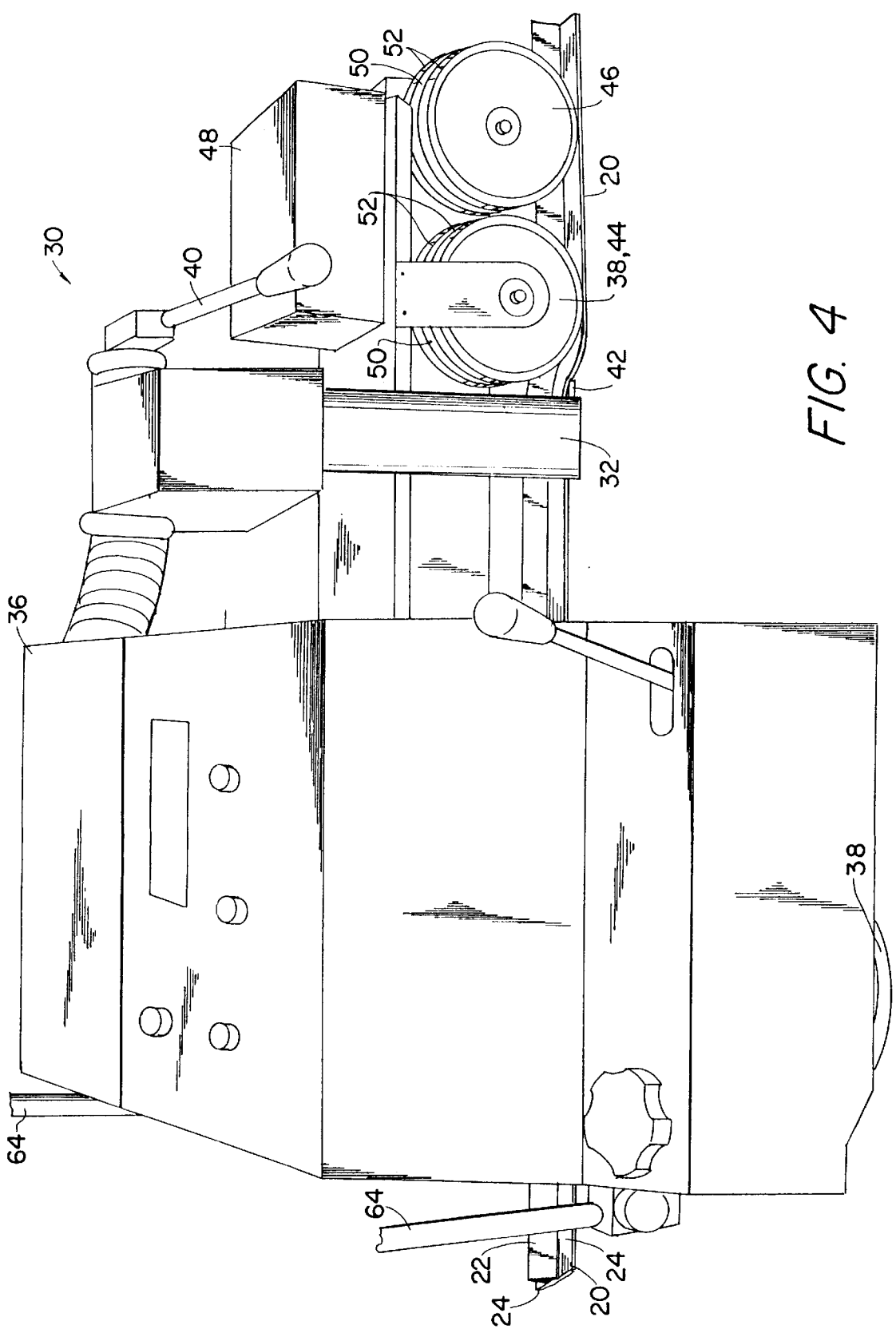
FIG. 4 is similar to FIG. 3, but showing the apparatus in use.
Figure 5:
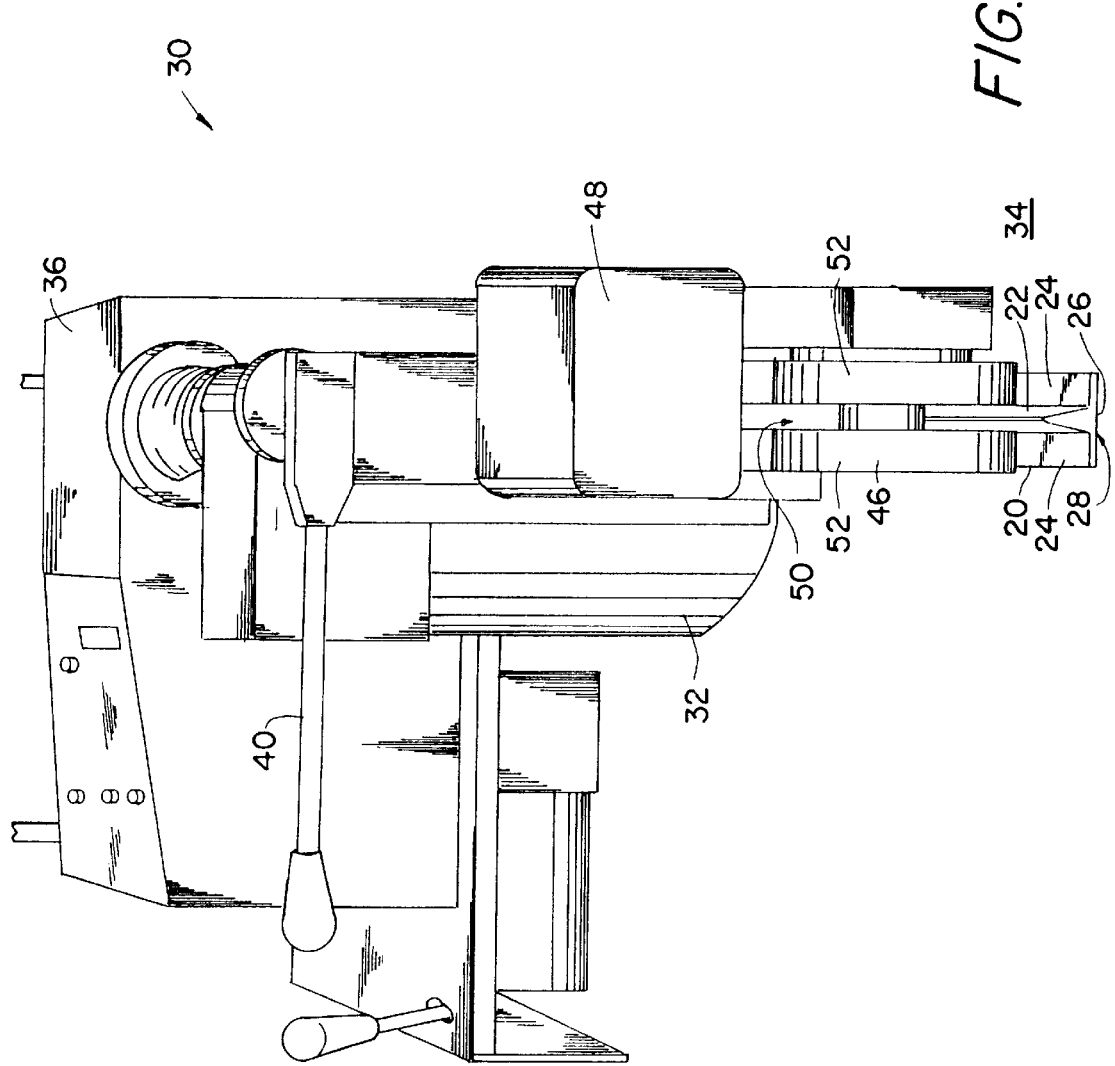
FIG. 5 is a perspective, generally rear view of the apparatus in use.
Figure 6:
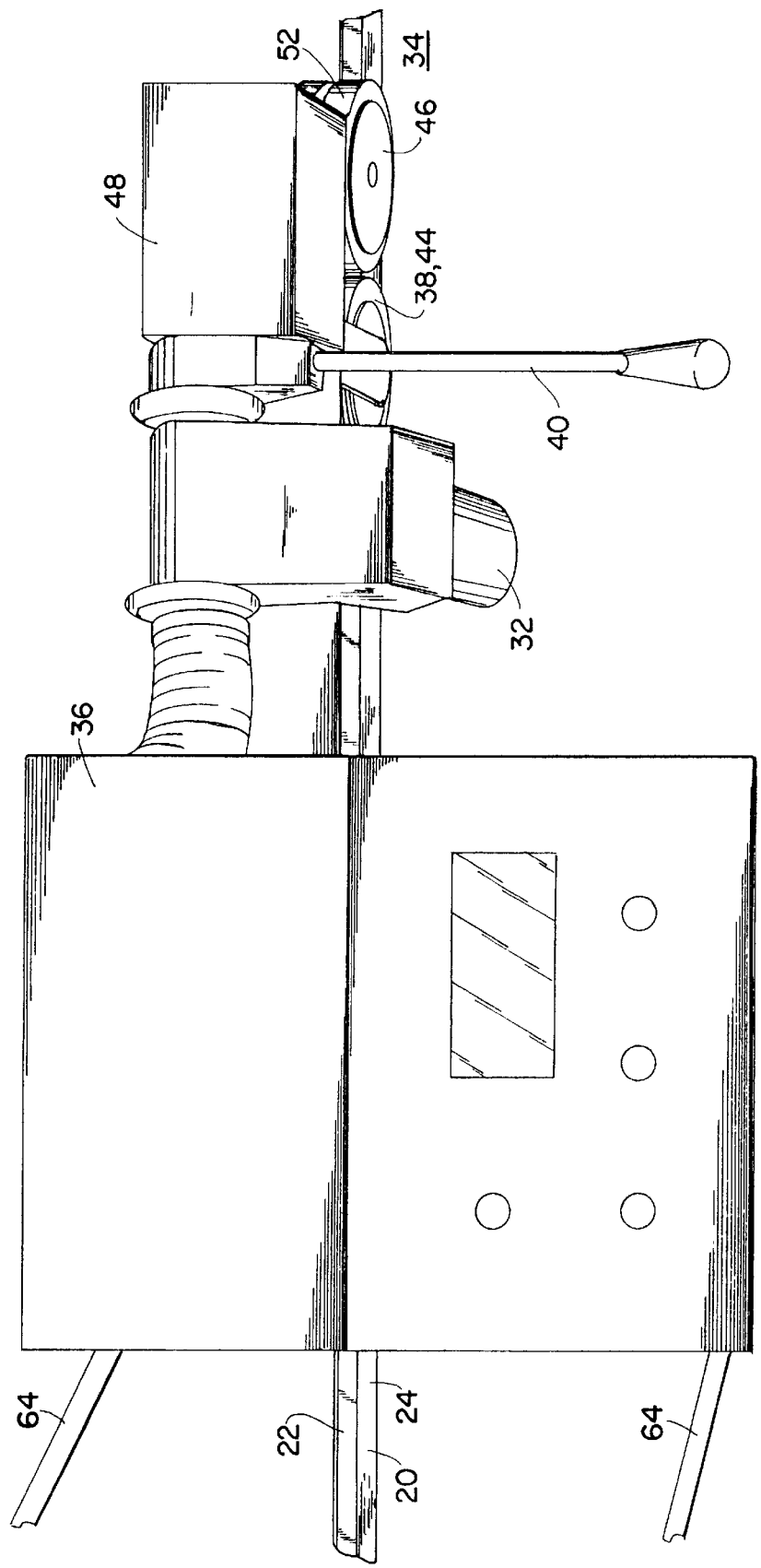
FIG. 6 is a perspective, generally top view of the apparatus in use.
Figure 7:
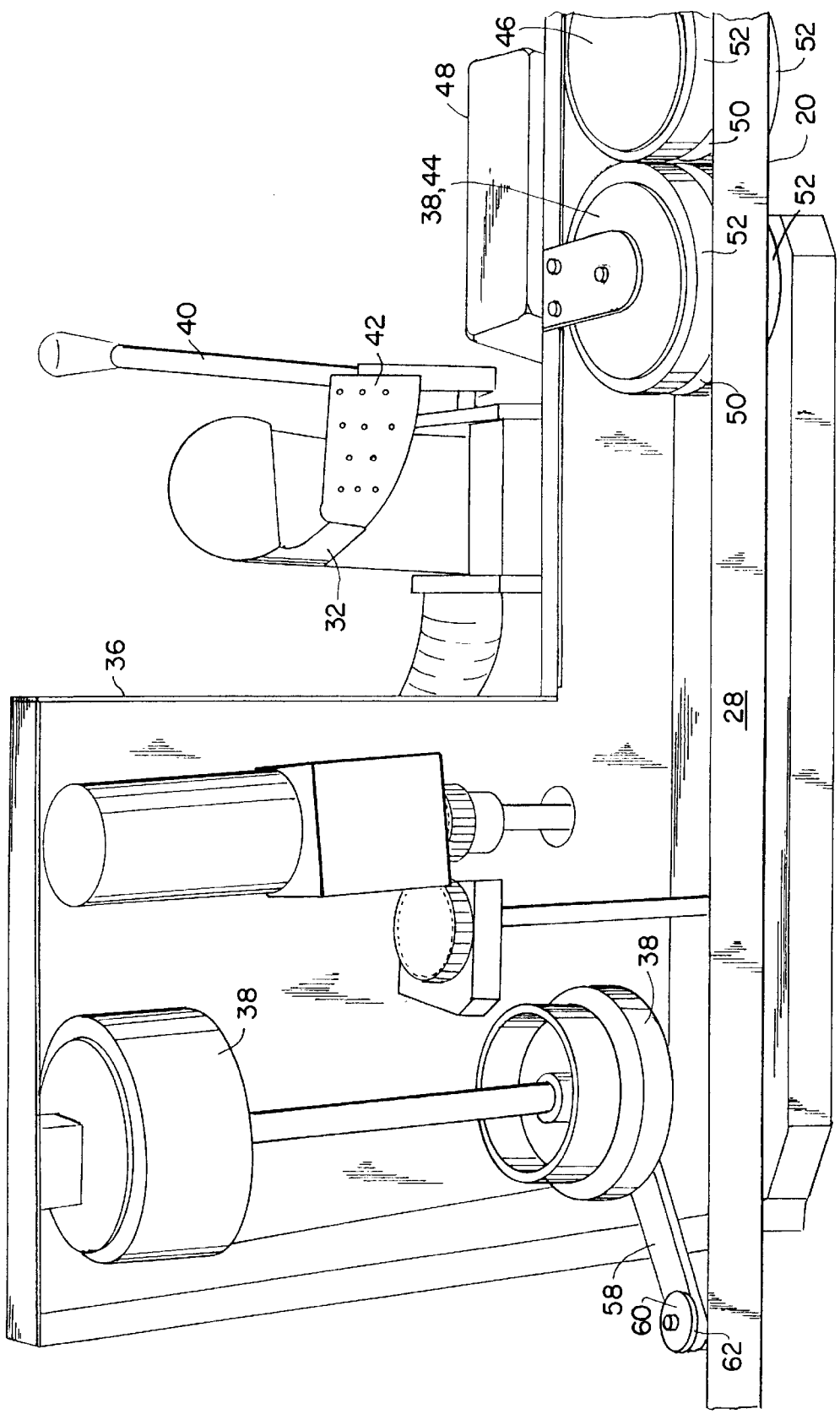
FIG. 7 is a perspective, generally bottom view of the apparatus in place for use, but with a heating nozzle in an inoperative position.
Figure 8:
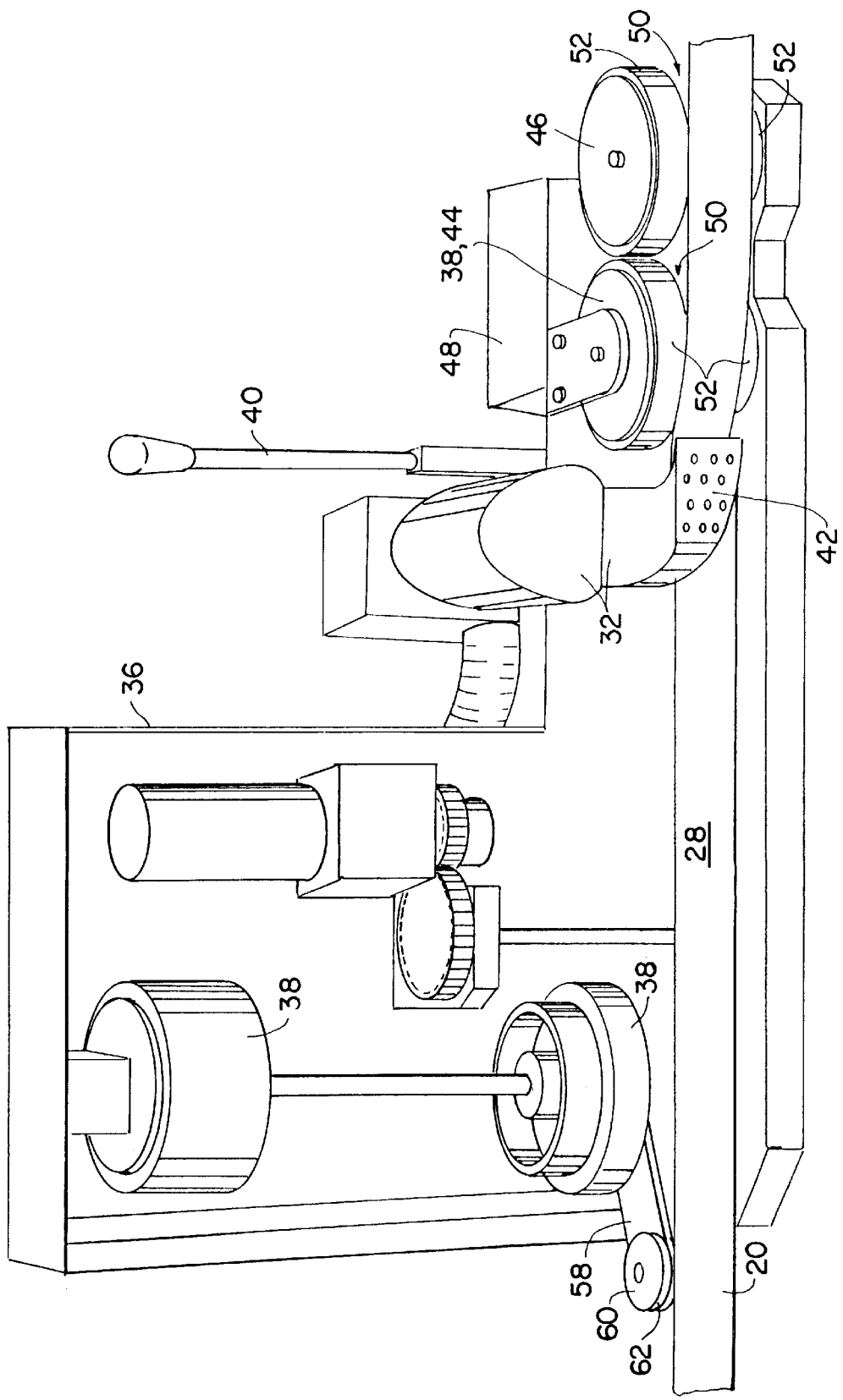
FIG. 8 is similar to FIG. 7 but showing the apparatus with the heating nozzle in an operational position.

The apparatus 30 further includes means for directing the apparatus along a line 54, (FIGS. 1 and 2) preferably marked on the membrane and delineating a selected position on the roof for the strip. The directing means includes means for positioning the strip in a desired location on the membrane. Such means include a guide member 56 which is a rigid member fixed to the housing 36, as by a bracket 58, and is of an inverted U-shape. The guide member 56 is adapted for placement over the strip central portion 22 (FIG. 2), such that the guide member is movable along the strip central portion 22, while the free ends of the U-shaped guide member 56 move over the opposed strip flange portions 24. The guide member 56 can thus urge the strip 20 into the apparatus 30 along a selected path, as will be further discussed hereinbelow.

The means for positioning the strip 20 further includes a tracking member 60 mounted on the housing 36, preferably by the bracket 58, proximate the guide member 56. When the tracking member 60 is moved along the line 54 drawn on the roof, it causes the strip 20 entering the guide member 56 to be positioned adjacent the line. The tracking member 60 preferably is in the form of a circular disc having peripheral edge 62 for engagement with the membrane 34. For guiding the apparatus 30 there is provided a handle 64 by which the apparatus is pulled, such that the disc edge 62 engages the line 54 marked on the membrane 34, to position the strip 20 ingested by the guide member 56 alongside the marked line 54 and in position to be acted upon by the nozzle 32 and the pressure wheels 44, 46.

In carrying out the method, the line 54 is marked on the roof, as by the well-known chalking of a straight line between two points, thereby presenting a visible line on the thermoplastic membrane 34. A strip 20 of thermoplastic material is placed generally alongside the chalk line 54. The apparatus 30 is then positioned such that the guide member 56 straddles the strip 20 and the handle 64 extends in the direction of movement of the apparatus.

The apparatus is powered electrically, both for driving the wheels 38 and for heating air for the nozzle 32. The apparatus is turned on by an operator (not shown), who positions the nozzle 32 such that the blade-like portion 42 inserts between the bottom surface 28 of the strip 20 and the underlying membrane 34, to heat both simultaneously. The operator guides the apparatus 30 such that the tracking disc peripheral edge 62 rolls along the marked line 54, while the guide member 56 ingests the strip 20 serially into the apparatus 30 and positions the strip adjacent the line 54.

Using the apparatus 30, the operator heats the strip bottom surface 28 and the membrane 34 therebeneath, and thereafter presses the strip 20 into firm engagement with the membrane 34, by rolling the pressure wheels 44, 46, over the strip flange portions 24, to fuse or weld the strip 20 to the membrane 34 without a need for bonding agents, adhesives, or the like.

The apparatus 30 is then removed from the strip 20 just completed and moved on to a further strip, if needed.

There is thus provided a method for attaching thermoplastic strips to a thermoplastic roof membrane covering by quick, easy and inexpensive application. The method thereby provides for an inexpensive combination of the appearance of a metal roof and the water tight integrity of a thermoplastic membrane roof.

It is to be understood that the present invention is by no means limited to the particular method steps herein disclosed and/or shown in the drawings, but also comprises any modification or equivalent within the scope of the claims. For example, while the inventive method has been described hereinabove in the context of enhancing appearance of a roof, and while it is contemplated that the method, in large measure, will be used for such purpose, it is equally applicable to those instances in which channeling of flow of rain water or snow to selected gutters or receptacles is required. In such instances, the strips can be positioned for establishing desired channels of flow, rather than for aesthetics.

What is claimed is:

1. A method for attaching thermoplastic strips to thermoplastic roof membranes, the method comprising the steps of:

providing strips of thermoplastic material, the strips each comprising an upstanding central portion extending lengthwise thereof, and opposed flange portions extending widthwise from the central portion;

positioning the strip proximate a selected position on a roof membrane for attachment to the roof membrane;

providing a self-propelled apparatus having a guide member mounted thereon, a nozzle mounted thereon for directing heated air between the strip and the roof membrane, a wheel mounted thereon for pressing the strip onto the roof membrane, and a tracking member mounted thereon forwardly of the nozzle, the tracking member comprising a rotatable disc;

directing the apparatus along a line delineating the selected position on the roof membrane by rolling the tracking member disc forwardly of the nozzle along the line, and moving the guide member over the strip to cause the strip to enter the apparatus adjacent the line to position the strip adjacent the line; and heating the strip with the nozzle, and pressing the strip onto the roof membrane with the pressing wheel;

whereby to attach the strip to the roof membrane adjacent the line.

2. The method in accordance with claim 1 wherein the strip central portion and the opposed flange portions form a unitary bottom surface of the strip, and the step of directing heat between the strip and the roof membrane includes directing the heated air onto the strip bottom surface and onto the membrane simultaneously.

3. The method in accordance with claim 1 wherein the step of pressing the strip onto the roof membrane comprises rolling the pressing wheel of the apparatus on the strip flange portions.

4. The method in accordance with claim 3 wherein the pressing wheel is provided with a peripheral groove and a first peripheral edge on a first side of the groove and a second peripheral edge on a second side of the groove, and the method step of rolling the pressing wheel comprises placing the peripheral groove over the strip central portion and the first and second peripheral edges on the opposite flange portions, respectively, and rolling the pressing wheel along the flange portions to press the flange portions onto the membrane.

5. The method in accordance with claim 1 wherein the guide member is of an inverted U-shape configuration and the method step of guiding the strip further comprises moving the inverted U-shape guide member over the strip and along the central portion and moving the ends of the U-shape guide member over the opposed strip flange portions.

6. A method for attaching thermoplastic strips to thermoplastic roof membranes, the method comprising the steps of:
    establishing a line on a roof membrane delineating a selected location for a strip of thermoplastic material;
    placing the strip of thermoplastic material proximate the line;
    providing an apparatus having a tracking member mounted thereon and a guide member for positioning the strip adjacent the line, the apparatus having means rearwardly of the tracking member and the guide member for heating the strip on an underside thereof and heating the roofing membrane therebeneath, and for thereafter pressing the strip onto the roof membrane;
    moving the tracking member along the line such that the guide member ingests the strip serially into the apparatus and positions the strip adjacent the line;
    using the apparatus, heating the strip while simultaneously heating the roof membrane therebeneath; and
    using the apparatus, pressing the strip onto the roof membrane to attach the strip to the membrane.

7. The method in accordance with claim 6 wherein the strip comprises a central portion and opposed flange portions forming a unitary bottom surface of the strip, and the method step of heating the strip and the roof membrane simultaneously includes directing heated air onto the strip bottom surface and onto the membrane simultaneously.

8. The method in accordance with claim 7 wherein the apparatus includes a pressing wheel, and the method step of pressing the strip onto the roof membrane comprises rolling the pressing wheel on the strip flange portions.

9. The method in accordance with claim 8 wherein the pressing wheel is provided with a peripheral groove and a first peripheral edge on a first side of the groove and a second peripheral edge on a second side of the groove, and the method step of rolling the pressing wheel comprises placing the wheel peripheral groove over the strip central portion and the wheel first and second peripheral edges on the opposite flange portions, respectively, and rolling the pressing wheel edges along the flange portions to press the flange portions onto the membrane.

10. The method in accordance with claim 6 wherein the tracking member comprises a rotatable disc, and the step of moving the tracking member along the line comprises rolling the disc along the line.

11. The method in accordance with claim 6 wherein the guide member is of an inverted U-shape configuration and the method step of guiding the strip further comprises moving the inverted U-shape guide member over the strip and along the central portion and moving the ends of the U-shape guide member over the opposed strip flange portions.

12. A method for attaching thermoplastic strips to thermoplastic roof membranes, the method comprising the steps of:
    providing strips of thermoplastic material, the strips each comprising an upstanding central portion extending lengthwise thereof, and opposed flange portions extending widthwise from the central portion;
    positioning the strip proximate a selected position on a roof membrane for attachment to the roof membrane;
    providing a self-propelled apparatus having a guide member for ingesting the strip and means disposed rearwardly of the guide member for affixing the strip onto the roof membrane, the guide member being of an inverted U-shape configuration, and having a tracking member mounted thereon; and
    directing the apparatus along a line delineating the selected position on the roof membrane to guide the strip into the guide member to position the strip adjacent the line, and to affix the strip onto the roof membrane alongside the line, wherein guiding the strip comprises moving the inverted U-shape guide member over the strip and along the central portion, and moving ends of the U-shape guide member over the opposed strip flange portions, and guiding the tracking member mounted on the apparatus along the line to position the guide member, and thereby the strip, adjacent the line.

* * * * *